US010373316B2

(12) United States Patent
Jales Costa et al.

(10) Patent No.: US 10,373,316 B2
(45) Date of Patent: Aug. 6, 2019

(54) IMAGES BACKGROUND SUBTRACTION FOR DYNAMIC LIGHTING SCENARIOS

(71) Applicant: Ford Global Technologies, LLC, Dearborn, MI (US)

(72) Inventors: Bruno Sielly Jales Costa, Sunnyvale, CA (US); Madeline J Goh, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 134 days.

(21) Appl. No.: 15/492,961

(22) Filed: Apr. 20, 2017

(65) Prior Publication Data

US 2018/0308236 A1   Oct. 25, 2018

(51) Int. Cl.
*G06K 9/00* (2006.01)
*G06T 7/11* (2017.01)
(Continued)

(52) U.S. Cl.
CPC .............. *G06T 7/11* (2017.01); *G06T 7/194* (2017.01); *G06T 7/254* (2017.01); *G06T 11/60* (2013.01); *G08B 21/18* (2013.01); *H04N 7/183* (2013.01); *G06T 2207/10024* (2013.01); *G06T 2207/10152* (2013.01); *G06T 2207/30268* (2013.01)

(58) Field of Classification Search
None
See application file for complete search history.

(56) References Cited

U.S. PATENT DOCUMENTS 5,546,475 A * 8/1996 Bolle .................. G06K 9/4647
382/110
5,805,742 A * 9/1998 Whitsitt ................ G01S 3/781
250/203.6

(Continued)

FOREIGN PATENT DOCUMENTS

CN    101950352 A    1/2011
CN    103793921 A    5/2014
(Continued)

OTHER PUBLICATIONS

Illumination-invariant image matching—sensing, Xue Wan et al., Elsevier, 2016, pp. 198-213 (Year: 2016).*

*Primary Examiner* — Jayesh A Patel
(74) *Attorney, Agent, or Firm* — David R. Stevens; Stevens Law Group

(57) ABSTRACT

A method and an apparatus for background subtraction highly applicable in autonomous driving scenarios are described. The method involves a reduction of illumination effects by constructing a normality background image from a normality model based on a plurality of baseline images taken under different illuminating conditions. A subtracted image is obtained by subtracting the normality background image from a scene image pixel-wise (i.e., pixel-by-pixel). The scene image may contain one or more foreground objects. The foreground objects are identified by highlighting the pixels in the subtracted image whose intensity is more than a predetermined standard deviation in the normality model. An illumination-invariant color space transformation algorithm may optionally be utilized to further reduce the variant illumination effects.

19 Claims, 7 Drawing Sheets

(51) Int. Cl.
*G06T 11/60* (2006.01)
*H04N 7/18* (2006.01)
*G08B 21/18* (2006.01)
*G06T 7/254* (2017.01)
*G06T 7/194* (2017.01)

(56) References Cited

U.S. PATENT DOCUMENTS

| | | | | |
|---|---|---|---|---|
| 6,625,310 B2* | 9/2003 | Lipton | ............... | G06K 9/00771 375/240.01 |
| 6,658,136 B1* | 12/2003 | Brumitt | ............... | G06K 9/00362 382/103 |
| 6,678,413 B1* | 1/2004 | Liang | ............... | A61B 5/1113 348/169 |
| 6,850,630 B1* | 2/2005 | Barbaresco | ............... | G06T 7/254 348/155 |
| 6,912,313 B2* | 6/2005 | Li | ............... | G06T 11/00 348/586 |
| 7,305,124 B2 | 12/2007 | Zhao | | |
| 7,477,780 B2* | 1/2009 | Boncyk | ............... | G06K 9/00979 382/165 |
| 7,808,532 B2 | 10/2010 | Sun | | |
| 7,860,311 B2* | 12/2010 | Chen | ............... | G06K 9/00711 382/173 |
| 8,358,834 B2* | 1/2013 | Cobb | ............... | G06K 9/00771 382/155 |
| 8,754,960 B2 | 6/2014 | Ashdown | | |
| 8,774,504 B1 | 7/2014 | Sundareswara | | |
| 8,897,571 B1* | 11/2014 | Robinson | ............... | G06K 9/0063 250/339.01 |
| 9,270,899 B1* | 2/2016 | Ivanchenko | ............... | G06T 7/11 |
| 2004/0001612 A1* | 1/2004 | Gutta | ............... | G06K 9/00771 382/107 |
| 2004/0037466 A1* | 2/2004 | Gewaltig | ............... | G06T 5/20 382/199 |
| 2004/0151342 A1* | 8/2004 | Venetianer | ............... | G06K 9/00624 382/103 |
| 2004/0175058 A1* | 9/2004 | Jojic | ............... | G06K 9/00711 382/305 |
| 2006/0245618 A1* | 11/2006 | Boregowda | ............... | G06T 7/215 382/107 |
| 2008/0152236 A1* | 6/2008 | Vendrig | ............... | G06K 9/38 382/224 |
| 2008/0170751 A1* | 7/2008 | Lei | ............... | G06T 7/215 382/103 |
| 2008/0181499 A1* | 7/2008 | Yang | ............... | G06T 7/12 382/174 |
| 2010/0290710 A1* | 11/2010 | Gagvani | ............... | G06K 9/00543 382/224 |
| 2011/0141251 A1* | 6/2011 | Marks | ............... | G06T 1/0014 348/61 |
| 2012/0027842 A1* | 2/2012 | Hutchinson | ............... | A61K 9/0048 424/450 |
| 2013/0050432 A1* | 2/2013 | Perez | ............... | G02B 27/017 348/47 |
| 2013/0243313 A1* | 9/2013 | Civit | ............... | G06T 5/002 382/164 |
| 2014/0079287 A1* | 3/2014 | Daniell | ............... | G01S 15/89 382/103 |
| 2016/0042234 A1* | 2/2016 | Chen | ............... | G06K 9/00785 382/190 |
| 2016/0048974 A1* | 2/2016 | Zaitsev | ............... | G06K 9/6202 382/107 |

FOREIGN PATENT DOCUMENTS

| | | | |
|---|---|---|---|
| CN | 104200473 A | * 12/2014 | |
| CN | 104835142 A | 8/2015 | |
| WO | WO 2007/076892 | 7/2007 | |
| WO | WO-2007076892 A1 | * 7/2007 | ............... G06K 9/38 |

* cited by examiner

IMAGES BACKGROUND SUBTRACTION FOR DYNAMIC LIGHTING SCENARIOS

TECHNICAL FIELD

The present disclosure generally relates to image background subtraction and recognition of foreground objects and, more particularly, to reduction of illumination effects for reliable background subtraction.

BACKGROUND

Robust and reliable background subtraction is of critical importance for recognizing and tracking objects in many autonomous driving scenarios. There are many approaches for identifying foreground objects (or foreign objects) in a scene depending on whether the background is static or dynamic. For example, a simple inter-frame difference with a global threshold value may reveal foreign objects in a static background but may not be sensitive to phenomena that violate the basic assumptions of a static background subtraction, e.g., a rigorously fixed camera with a static noise-free background. In real-life scenarios, the illumination can change (gradually or suddenly), the background may contain moving objects (e.g., shadowing area change, trees shaken by the wind), and the camera may jitter and so forth. Existing background subtraction techniques have poor capability in handling variant illuminating conditions, causing false recognition of foreground objects when the illuminating condition is significantly different from a reference illumination. A particular application of background subtraction for identification of objects left in a vehicle is the vehicle interior monitoring for ride share/hailing service, where the illuminating conditions of the vehicle interior may be extremely different in a 24-hours period on locations such as the vehicle floor.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
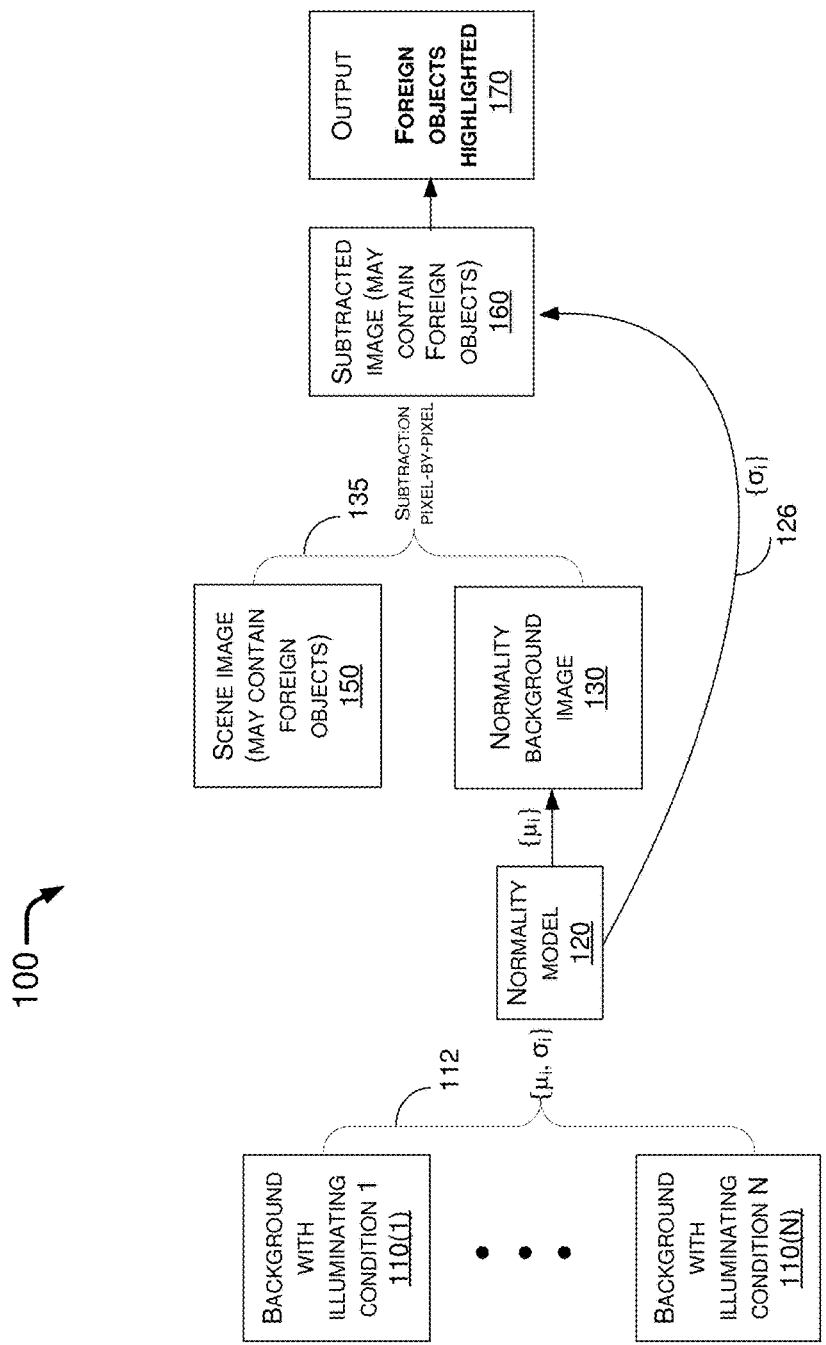
FIG. 1 is a block diagram illustrating a scheme of image background subtraction in accordance with the present disclosure.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The present disclosure describes herein a background subtraction method capable of reducing or otherwise mitigating variant illuminating conditions for consistent recognition of foreground objects.

In various embodiments in accordance with the present disclosure, an image background subtraction system may collect a plurality of baseline images under different illuminating conditions respectively. The baseline images may contain a scene with a background of interest but without foreground objects present in the scene. A normality model may be derived from the baseline images where the normality model comprises mean values and standard deviations of pixel intensity data of background pixels in the baseline images. The mean values and standard deviations may be associated with the RGB (Red, Green, and Blue) intensities of each pixel of the background pixels. A scene image or a sequence of frames may be received for identification of whether any foreground object is present in the background. The normality model may project a normality background image that is a best representation of the background under the illuminating condition of the scene image or an average representation of variant illuminating conditions. A comparison of the normality background image and the scene image is conducted and may result in a first subtracted image by subtracting the RGB pixel intensities of the normality background image from the scene image pixel-wise (e.g., pixel by pixel). The pixels in the first subtracted image may be further filtered by a standard deviation threshold which may be determined by the illuminating condition of the scene image. Foreground pixels in the subtracted image as opposed to the background pixels may be identified for those pixels whose RGB intensities are more than the predetermined standard deviation threshold. The resulting foreground pixels after filtration of the predetermined standard deviation threshold may be referred as a residual image or output of the image background subtraction system.

In some embodiments, the scene image and the normality background image may be further subject to an illumination-invariant color space transformation that reduces the effect of variant illuminations. The objective of the illumination-invariant color space transformation is to improve the consistency of object appearance over a wide range of illumination changes. The object appearance may depend on the material properties of the objects regardless of the intensities of source illumination. The algorithm of the illumination-invariant color space transformation adopted in the present disclosure may be based on the reference "*Illumination Invariant Imaging: Applications in Robust Vision-based Localisation, Mapping and Classification for Autonomous Vehicles*" by W. Maddern et al. published in "*Proceedings of the Visual Place Recognition in Changing Environments Workshop, IEEE International Conference on Robotics and Automation (ICRA), Hong Kong, China, 2014*". Alternatively or additionally, any other suitable algorithm may be utilized.

The application of the above-mentioned illumination-invariant color space transformation to the scene image and to the normality background image may produce an illumination-invariant scene image (II scene image) and an illumination-invariant normality background image (II normality background image) respectively. A comparison of the II normality background image and the II scene image is conducted and may result in a second subtracted image by subtracting the RGB pixel intensities of the II normality background image from the II scene image. A matrix operation called Hadamard product may be operated on the residual image and the second subtracted image to further clean up the foreground pixels in the residual image that may be obtained with a small sample size of the baseline images. The Hadamard product is a multiplying matrix operation that take two matrices of the same dimension and produce another matrix of an equal dimension where each element ij is the product of elements ij of the original two matrices. The Hadamard product is an AND operation on the elements of two original matrices.

FIG. 1 illustrates a conceptual representation of an example scheme 100 of background subtraction methodology employed in accordance with the present disclosure. Presentation 100 may involve an example apparatus 200 described in FIG. 2 to collect a plurality of baseline images 110(1)-110(N), where N is a positive integer. The baseline images 110(1)-110(N) may be taken under a variety of illuminating conditions, and may contain a background of interest without foreground objects present in the scene. A normality model 120 may be derived from pixel information of the baseline images 110(1)-110(N) for each pixel in the baseline images 110(1)-110(N) with mean values and standard deviations averaged over the ensemble of the baseline images 110(1)-110(N) or a set of mean values and standard deviations corresponding to categorized illuminating conditions of the baseline image 110(1)-110(N) respectively. The illuminating conditions of the baseline image 110(1)-110(N) may be categorized as high illumination or low illumination, right-side illuminated or left-side illuminated, natural light or interior light, and so forth. The categorized illuminating conditions may allow the normality model 120 to project a best representation of normality background image 130 approximating to the illuminating condition of a scene image 150 that is processed by the example apparatus. Numeral reference 112 indicates the action performed on the ensemble of the baseline image 110(1)-110(N) to statistically obtain a mean value ($\mu_i$) and a standard deviation ($\sigma_i$) of each pixel in the normality model 120, where i is an integer and $1 \leq i \leq m$, m is the number of pixels in one of the baseline images 110(1)-110(N). The normality model 120 may be established as a Gaussian distribution, a student-t distribution or other suitable statistical distributions best fitted to the distribution of the baseline images 110(1)-110(N) with a set of $\{\mu_i\}$ and a set of $\{\sigma_i\}$. The normality background image 130 projected from the normality model 120 may be a best representation to the scene image 150 when the illumination condition of the scene image 150 is analyzed and categorized, and the normality background image 130 may be projected accordingly. The analysis of the illuminating condition of the scene image 150 may be performed on distinctive features with/without a weighted average in the baseline images 110(1)-110(N).

An evaluation of foreground objects in the scene image 150 may be carried out by subtracting the normality background image 130 from the scene image 150, pixel by pixel. A subtracted image 160 resulting from the difference of RGB pixel intensities may be obtained by action 135. The RGB intensities of pixels in the subtracted image 160 may represent how far away the RGB intensities are from the mean value ($\mu_i$) of the normality background images respectively. Thus, foreground pixels in the subtracted image 160 may be characterized as pixels whose RGB intensities are more than a predetermined standard deviation threshold away from the mean values of the pixels in the normality background image 130. The standard deviation threshold may be assessed by the illuminating condition of the scene image 150, and may be a multiple of the standard deviation $\sigma_i$ such as $1.2\sigma_i$, $2.5\sigma_i$, or $3\sigma_i$. Once the subtracted image 160 is filtered by the action 126, the foreground pixels qualified for the standard deviation threshold test may be highlighted, and the remaining pixels in the subtracted image 160 may be removed to produce an output image 170.

Figure 2:
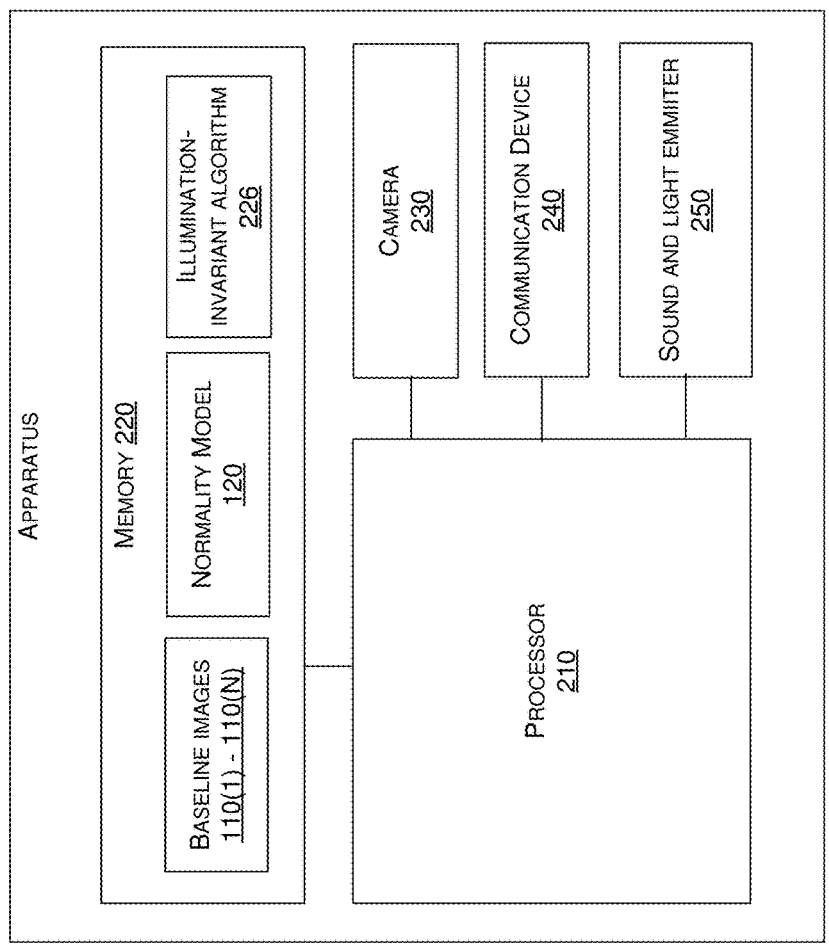
FIG. 2 is a block diagram depicting an example apparatus of image background subtraction in accordance with an embodiment of the present disclosure.

FIG. 2 illustrates an example apparatus 200 capable of image background subtraction in accordance with an embodiment of the present disclosure. Apparatus 200 may perform various functions related to techniques, methods and systems described herein, including those described above with respect to scheme 100 as well as those described below with respect to processes 300 and 400. Apparatus 200 may be installed in, equipped on, connected to or otherwise implemented in a vehicle or mounted at a street intersection to effect various embodiments in accordance with the present disclosure. Apparatus 200 may include one or more of the components illustrated in FIG. 2.

In some embodiments, apparatus 200 may include at least one camera 230 and a processor 210 communicatively coupled to the at least one camera 230 to perform background subtraction in accordance with the present disclosure for images taken by camera 230. For illustrative purpose and without limitation, a single camera 230 is shown in FIG. 2 although the actual quantity may vary in various implementations. Camera 230 may take or otherwise capture a plurality of baseline images 110(1)-110(N) under variant illuminating conditions, and processor 210 may continuously monitor a background of interest in the baseline images 110(1)-110(N). Camera 230 may have built-in light sensor(s) to measure illuminating levels of the background scene. Camera 230 may be mounted inside of a vehicle for autonomous driving applications or at street intersection for traffic flow analysis.

In some embodiments, apparatus 200 may include a communication device 240 communicatively coupled to and controlled by processor 210. Communication device 240 may be configured to receive instructions from and/or transmit data/images to one or more components inside/outside an autonomous vehicle. Communication device 240 may be configured to communicate wirelessly and/or via wire(s) in accordance with any suitable wireless and/or wired standards, specifications and/or protocols.

In some embodiments, apparatus 200 may include a memory device 220 configured to store the baseline images 110(1)-110(N), a normality model 120, and instructions and/or codes with respect to an illumination-invariant color space transformation algorithm 226. For example, memory device 220 may store a set of mean values and a set of standard deviations in the normality model based on the statistical pixel-intensity distribution of the baseline images 110(1)-110(N).

In some embodiments, processor 210 may be configured to perform operations pertaining to scheme 100. Processor 210 may also be coupled to memory device 220 to access data stored therein and to execute any algorithm stored therein. Processor 210 may be configured to output processed images to display device(s) through communication device 240. Processor 210 may analyze the illuminating condition of the scene image 150 and categorize the illuminating condition by a weighted average over distinctive feature in the scene image 150. Processor 210 may further project a normality background image 130 from the normality model 120 stored in the memory device 220 to a best representation of the scene image 150. In some embodiments, processor 210 may perform a subtraction of the normality background image 130 from the scene image 150 to produce a subtracted image 160. In some embodiments, processor 210 may apply an illumination-invariant color space transformation to the normality background image 130 and the scene image 150 to obtain II normality background image and II scene image respectively.

In some embodiments, apparatus 200 may include a sound and light emitter 250 which may provide audio and/or visual indication(s) (e.g., a text message, a beeping sound and/or a flashing light) when one or more foreground objects are identified in the scene image 150 or in a scene image/frame.

Figure 3:
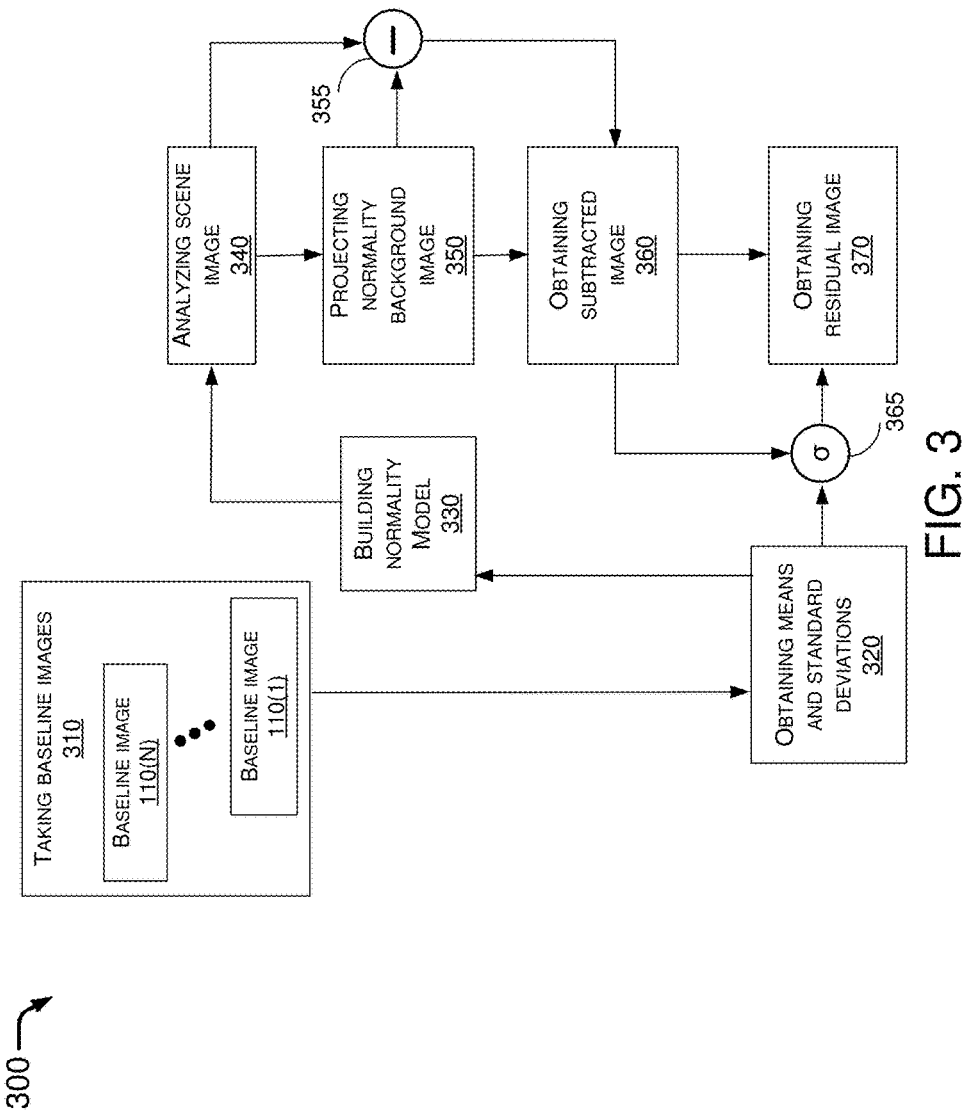
FIG. 3 is a block diagram depicting an example flow of background subtraction with a normality model in accordance with an embodiment of the present disclosure.

FIG. 3 illustrates an example process 300 of background subtraction in accordance with the present disclosure. Process 300 may be utilized to identify foreground objects in a scene image 150 by subtracting the background from the scene image 150. Process 300 may include one or more operations, actions, or functions shown as blocks such as 310, 320, 330, 340, 350, 360 and 370. Although illustrated as discrete blocks, various blocks of process 300 may be divided into additional blocks, combined into fewer blocks, or eliminated, depending on the desired implementation, and may be performed or otherwise carried out in an order different from that shown in FIG. 3. Process 300 may be implemented in scheme 100 by apparatus 200. For illustrative purposes and without limiting the scope of process 300, the following description of process 300 is provided in the context of scheme 100 as being implemented by apparatus 200. Process 300 may begin with block 310.

At 310, process 300 may involve camera 230 of apparatus 200 taking a plurality of baseline images 110(1)-110(N) containing a background of interest without foreground objects. The taking of the baseline images 110(1)-110(N) may be initiated by processor 210 at scheduled intervals or in response to illumination variations detected by camera 230. The baseline images 110(1)-110(N) may be stored in memory device 220. Process 300 may proceed from 310 to 320.

At 320, process 300 may involve processor 210 analyzing pixel RGB intensities of the baseline images 110(1)-110(N) and calculating mean values and standard deviations of RGB intensities for each pixel in the baseline images 110(1)-110(N). Process 300 may proceed from 320 to 330.

At 330, process 300 may involve processor 210 constructing a normality model 120 based on the information obtained at 320. Normality model 120 may be an average over the ensemble of baseline images 110(1)-110(N) with a set of mean values and a set of standard deviations. Alternatively, normality model 120 may be categorized based on the illuminating conditions with a plurality of sets of mean values and a plurality of sets of standard deviations. Process 300 may proceed from 330 to 340.

At 340, process 300 may involve camera 230 taking a scene image 150 and processor 210 analyzing the illuminating condition of the scene image 150 via a built-in light sensors in camera 230. The analysis of the illuminating condition of scene image 150 may be a weighted average of distinctive features in scene image 150. Process 300 may proceed from 340 to 350.

At 350, process 300 may involve processor 210 projecting a normality background image 130 to a best representation of scene image 150 according to the analysis of the illuminating condition at block 340. Process 300 may proceed from 350 to 360.

At 360, process 300 may involve processor 210 obtaining a subtracted image 160 by subtracting the normality background image 130 from the scene image 150 pixel-by-pixel. The subtraction action is indicated by operation symbol 355. Process 300 may proceed from 360 to 370.

At 370, process 300 may involve processor 210 obtaining a residual image by highlighting the pixels in the subtracted image 160 with RGB intensities that are more than a predetermined standard deviation threshold. The standard deviation threshold may be a multiple of standard deviation $\sigma_i$ such as $1.2\sigma_i$, $2.5\sigma_i$, or $3\sigma_i$, and determined by the analysis of the illuminating condition at block 340. The filtered action on the subtracted image 160 with a predetermined standard deviation threshold is indicated by operation symbol 365.

Figure 4:
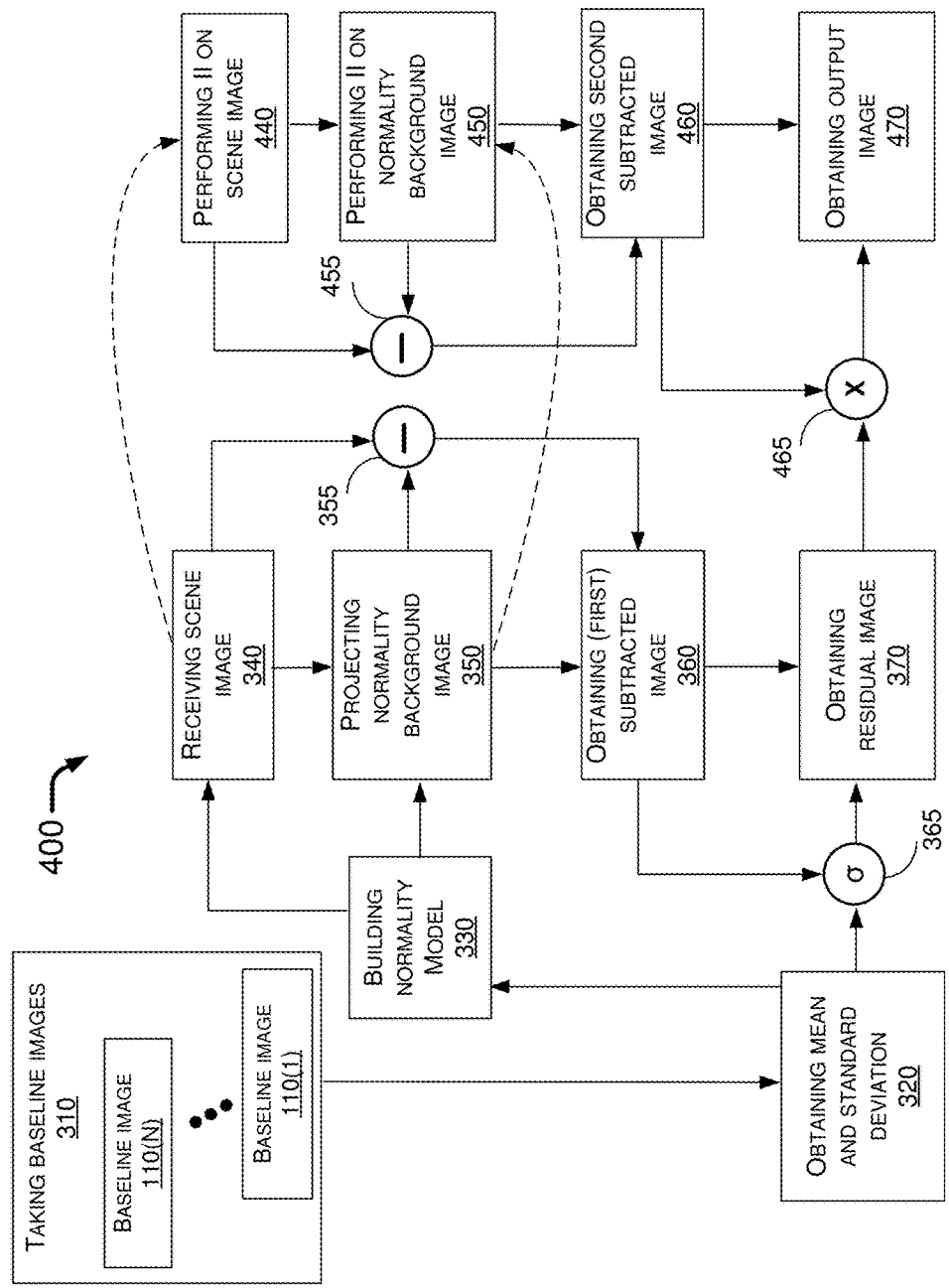
FIG. 4 is a block diagram depicting another example flow of background subtraction with an illumination-invariant color space transformation algorithm in accordance with an embodiment of the present disclosure.

FIG. 4 illustrates another example process 400 of background subtraction using illumination-invariant color space transformation in accordance with the present disclosure. Process 400 may be used to identify foreground objects as an enhancement of process 300 when the ensemble size of the baseline images 110(1)-110(N) is limited. In general, Gaussian distribution is deviated when the sample size N is less than 30 and the illumination-invariant color space transformation may be invoked. Process 400 may include one or more operations, actions, or functions shown as blocks such as 440, 450, 460, and 470. Although illustrated as discrete blocks, various blocks of process 400 may be divided into additional blocks, combined into fewer blocks, or eliminated, depending on the desired implementation, and may be performed or otherwise carried out in an order different from that shown in FIG. 4. Process 400 may be implemented in scheme 100 by processor 210. For illustrative purposes and without limiting the scope of process 400, the following description of process 400 is provided in the context of scheme 100 as being implemented by processor 210 of apparatus 200. Process 400 may also include functional blocks 310, 320, 330, 340, 350, 360, 370 and operations 355 and 365 of process 300. In the interest of brevity, the following description of process 400 is provided beginning with block 440 without repeating blocks 310-370.

At 440, process 400 may involve processor 210 applying an illumination-invariant color space transformation to scene image 150 and obtaining an illumination-invariant scene image. The illumination-invariant color space transformation may be based on the aforementioned algorithm. Process 400 may proceed from 440 to 450.

At 450, process 400 may involve processor 210 applying an illumination-invariant color space transformation to normality background image 130 and obtaining an illumination-invariant normality background image. The illumination-invariant color space transformation may be based on the proposed algorithm by aforementioned W. Maddern et al. Process 400 may proceed from 450 to 460.

At 460, process 400 may involve processor 210 obtaining a second subtracted image by subtracting illumination-invariant normality background image obtained at block 450 from illumination-invariant scene image obtained at block 440 pixel-by-pixel. The subtraction action is indicated by operation symbol 455. Process 400 may proceed from 460 to 470.

At 470, process 400 may involve processor 210 performing a Hadamard matrix operation between the first subtracted image 160 obtained at block 360 and the second subtracted image obtained at block 460 to produce an output image. The Hadamard matrix operation is indicated by operation symbol 465.

Figure 5:
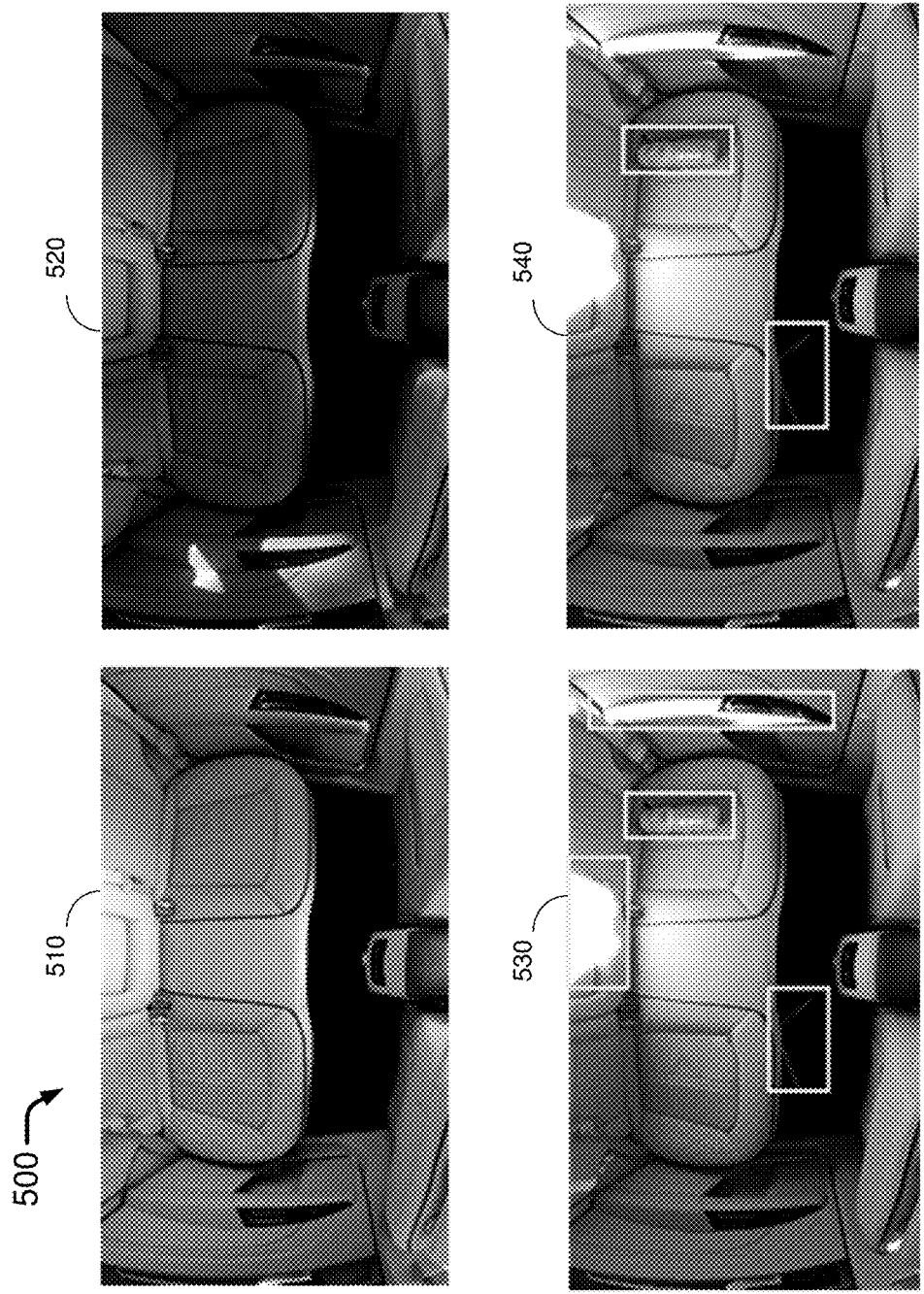
FIG. 5 shows example images of a vehicle interior under different illumination conditions and results of background subtraction in accordance with an embodiment of the present disclosure.

FIG. 5 illustrates example images taken and processed by apparatus 200 for recognition of foreign objects in accordance with the present disclosure. The example images in FIG. 5 contain a background scene of a vehicle interior. Images 510 and 520 may be considered as samples of the baseline images 110(1)-110(N) as described in scheme 100. Image 510 and image 520 have different illuminating conditions, the former may be characterized as having a high illumination and the latter may be characterized as having a low illumination. Images 530 and 540 may be considered as the scene image 150, as described in scheme 100 that contains foreign objects (a bottle water on the right side of the seat and a laptop computer on the left side of the floor) but are processed by two different background subtraction algorithms. The illuminating condition of images 530 and 540 in FIG. 5 may be considered as substantially different from image 510 or image 520.

Image 530 may be processed by a generic background subtraction algorithm and image 540 is processed by the proposed background subtraction algorithm in the present disclosure as described in process 300. The identified foreign objects are both outlined in images 530 and 540. Fictional foreign objects are outlined in image 530 as its illuminating condition causes the generic background subtraction algorithm to make false identifications, whereas image 540 correctly presents the desired result of the identification of the water bottle on the seat and the laptop on the floor. An action may be followed to interact with the autonomous driving system to remind passengers of the foreign objects left inside the vehicle.

Figure 6:
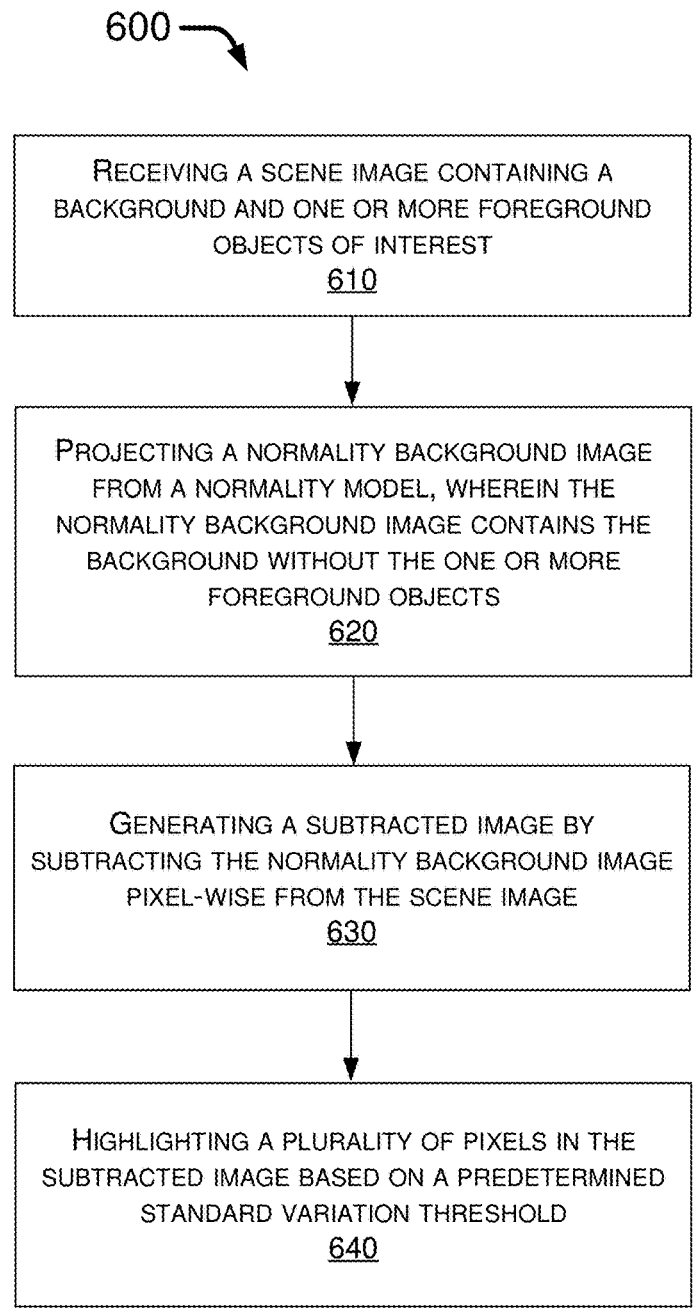
FIG. 6 is a flowchart of an example process in accordance with an embodiment of the present disclosure.

FIG. 6 illustrates an example process 600 in accordance with an embodiment of the present disclosure. Process 600 may include one or more operations, actions, or functions shown as blocks such as 610, 620, 630 and 640. Although illustrated as discrete blocks, various blocks of process 600 may be divided into additional blocks, combined into fewer blocks, or eliminated, depending on the desired implementation. Moreover, process 600 may be executed in orders different than that shown in FIG. 6. Process 600 may be implemented in scheme 100 and/or by apparatus 200. For illustrative purposes and without limitation, the following description of process 600 is provided in the context of apparatus 200. Process 600 may begin with block 610.

At 610, process 600 may involve apparatus 200 receiving a scene image containing a background and one or more foreground objects of interest. Process 600 may proceed from 610 to 620.

At 620, process 600 may involve apparatus 200 projecting a normality background image from a normality model. The normality background image may contain the background without the one or more foreground objects. Process 600 may proceed from 620 to 630.

At 630, process 600 may involve apparatus 200 generating a subtracted image by subtracting the normality background image pixel-wise from the scene image. Process 600 may proceed from 630 to 640.

At 640, process 600 may involve apparatus 200 highlighting a plurality of pixels in the subtracted image based on a predetermined standard deviation threshold.

In some embodiments, the normality background image may include a plurality of background pixels. Moreover, the normality model may include corresponding mean values and standard deviations of pixel intensity data associated with each background pixel of the background pixels in the normality background image.

In some embodiments, process 600 may further involve apparatus 200 constructing the normality model based on a plurality of baseline images taken under a plurality of illuminating conditions respectively. Each of the baseline images may contain the background but not the one or more foreground objects.

In some embodiments, in constructing the normality model, process 600 may involve apparatus 200 performing a number of acts. For instance, process 600 may involve apparatus 200 determining pixel intensity data of a plurality of sets of background pixels, with each set of the background pixels constituting a corresponding baseline image of the baseline images. Additionally, process 600 may involve apparatus 200 obtaining a mean value of the pixel intensity data for each background pixel of the background pixels. This is because each pixel has one mean value, which is calculated from the summation of the same pixel across all baseline images divided by the number of baseline images. Moreover, process 600 may involve apparatus 200 obtaining a standard deviation of the pixel intensity data for each background pixel of the background pixels. This is because each pixel has one standard deviation, which is calculated from the summation of the differences between each pixel and its mean (previously calculated) across all baseline images divided by the number of baseline images.

In some embodiments, in highlighting the pixels in the subtracted image based on a predetermined standard deviation threshold, process 600 may involve apparatus 200 highlighting the pixels in the subtracted image having corresponding pixel intensity data of the pixels more than the predetermined standard deviation threshold.

In some embodiments, in receiving the scene image, process 600 may involve apparatus 200 assessing an illuminating condition of the scene image for projecting the normality background image and for determining the predetermined standard deviation threshold.

Figure 7:
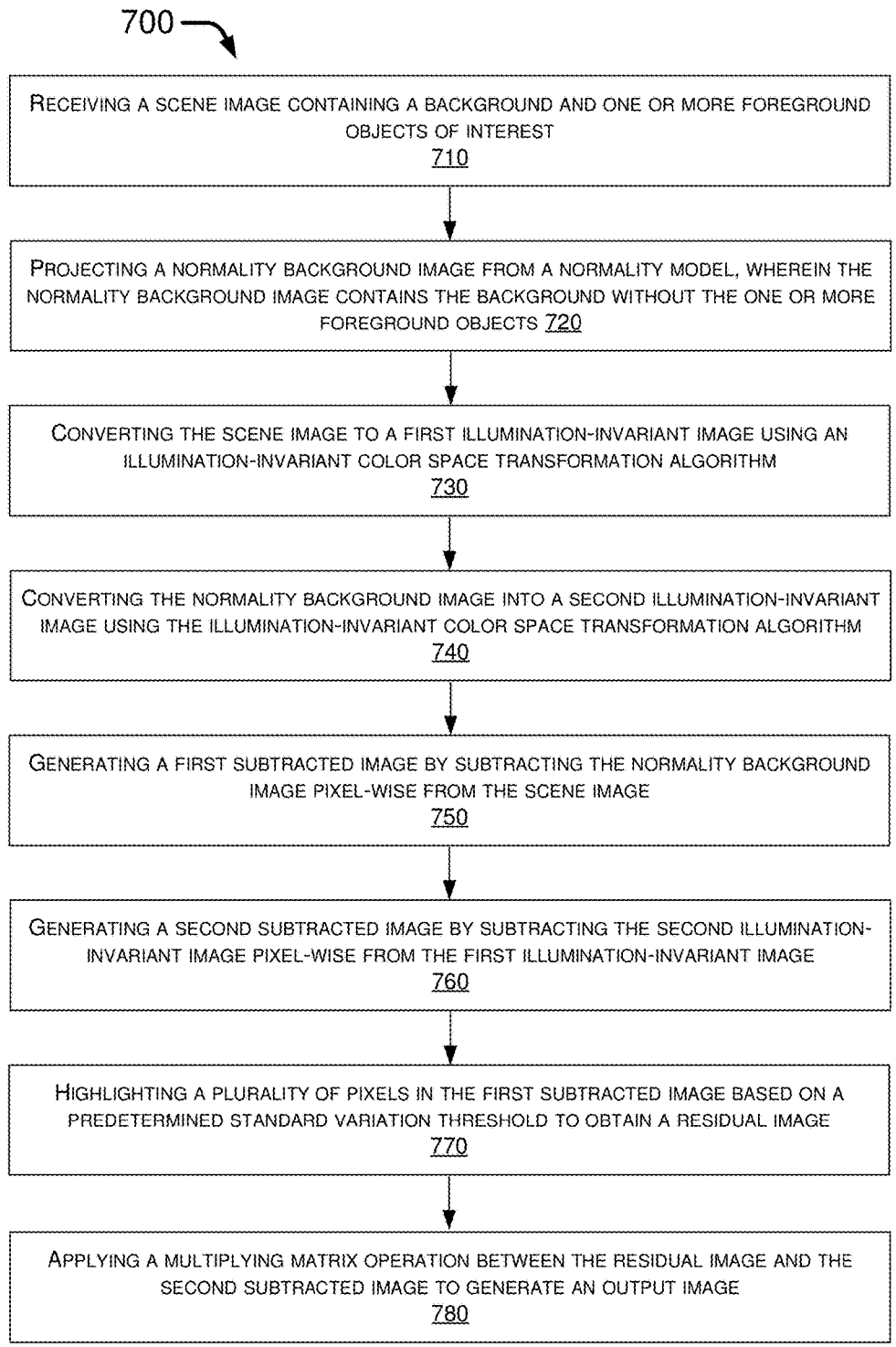
FIG. 7 is a flowchart of an example process in accordance with an embodiment of the present disclosure.

FIG. 7 illustrates an example process 700 in accordance with an embodiment of the present disclosure. Process 700 may include one or more operations, actions, or functions shown as blocks such as 710, 720, 730, 740, 750, 760, 770 and 780. Although illustrated as discrete blocks, various blocks of process 700 may be divided into additional blocks, combined into fewer blocks, or eliminated, depending on the desired implementation. Moreover, process 700 may be executed in orders different than that shown in FIG. 7. Process 700 may be implemented in scheme 100 and/or by apparatus 200. For illustrative purposes and without limitation, the following description of process 700 is provided in the context of apparatus 200. Process 700 may begin with block 710.

At 710, process 700 may involve apparatus 200 receiving a scene image containing a background and one or more foreground objects of interest. Process 700 may proceed from 710 to 720.

At 720, process 700 may involve apparatus 200 projecting a normality background image from a normality model, wherein the normality background image contains the background without the one or more foreground objects. Process 700 may proceed from 720 to 730.

At 730, process 700 may involve apparatus 200 converting the scene image to a first illumination-invariant image using an illumination-invariant color space transformation algorithm. Process 700 may proceed from 730 to 740.

At 740, process 700 may involve apparatus 200 converting the normality background image into a second illumination-invariant image using the illumination-invariant color space transformation algorithm. Process 700 may proceed from 740 to 750.

At 750, process 700 may involve apparatus 200 generating a first subtracted image by subtracting the normality background image pixel-wise from the scene image. Process 700 may proceed from 750 to 760.

At 760, process 700 may involve apparatus 200 generating a second subtracted image by subtracting the second illumination-invariant image pixel-wise from the first illumination-invariant image. Process 700 may proceed from 760 to 770.

At 770, process 700 may involve apparatus 200 highlighting a plurality of pixels in the first subtracted image based on a predetermined standard deviation threshold to obtain a residual image. Process 700 may proceed from 770 to 780.

At 780, process 700 may involve apparatus 200 applying a multiplying matrix operation between the residual image and the second subtracted image to generate an output image.

In some embodiments, the normality background image may include a plurality of background pixels. The normality model may include corresponding mean values and standard deviations of pixel intensity data associated with each background pixel of the background pixels in the normality background image.

In some embodiments, process 700 may further involve apparatus 200 constructing the normality model based on a plurality of baseline images taken under a plurality of illuminating conditions respectively. Each of the baseline images may contain the background but not the one or more foreground objects.

In some embodiments, in constructing the normality model, process 700 may involve apparatus 200 performing a number of acts. For instance, process 700 may involve apparatus 200 determining pixel intensity data of a plurality of sets of background pixels, with each set of the background pixels constituting a corresponding baseline image of the baseline images. Additionally, process 700 may involve apparatus 200 obtaining a mean value of the pixel intensity data for each background pixel of the background pixels. Moreover, process 700 may involve apparatus 200 obtaining a standard deviation of the pixel intensity data for each background pixel of the background pixels.

In some embodiments, in highlighting the pixels in the first subtracted image based on a predetermined standard deviation threshold, process 700 may involve apparatus 200 highlighting the pixels in the first subtracted image having corresponding pixel intensity data of the pixels more than the predetermined standard deviation threshold.

In some embodiments, the illumination-invariant color space transformation algorithm may reduce effects of a plurality of illuminating conditions present on the scene image and the normality background image such that pixel intensity data of the scene image and the normality background image depend primarily on a material property of an object instead of the illuminating conditions.

In some embodiments, in receiving the scene image, process 700 may involve apparatus 200 assessing an illuminating condition of the scene image for projecting the normality background image and for determining the predetermined standard deviation threshold.

In some embodiments, the multiplying matrix operation may take the residual image and the second subtracted image of a same dimension as input to produce the output image with the same dimension. Moreover, the multiplying matrix operation may multiply pixel intensity data of a same pixel location in the residual image and the second subtracted image respectively.

In the above disclosure, reference has been made to the accompanying drawings, which form a part hereof, and in which is shown by way of illustration specific implementations in which the present disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure.

The invention claimed is:

1. A method of sending a signal to a passenger of a transportation vehicle, comprising:
   receiving a scene image of an interior of the transportation vehicle, the scene image containing a background and one or more foreground objects of interest;
   projecting a normality background image of the interior from a normality model, wherein the normality background image comprises a plurality of background pixels that represents the background without the one or more foreground objects;
   generating a subtracted image by subtracting the normality background image pixel-wise from the scene image;
   highlighting a plurality of pixels in the subtracted image based on a standard deviation threshold to identify at least one of the one or more foreground objects as a foreign object to the transportation vehicle;
   displaying the subtracted image including the plurality of highlighted pixels on a display device; and
   generating a text message, a beeping sound or a flashing light as the signal to remind the passenger of the foreign object,
   wherein the normality model comprises corresponding mean values and standard deviations of pixel intensity data associated with each of the plurality of background pixels of the normality background image,
   wherein each of the plurality of pixels highlighted in the subtracted image has a corresponding pixel intensity that is more than the standard deviation threshold of the respective pixel, and
   wherein the standard deviation threshold of the respective pixel is a multiple of the corresponding standard deviation associated with the respective pixel in the normality model.

2. The method of claim 1, further comprising:
   constructing the normality model based on a plurality of baseline images taken under a plurality of illuminating conditions respectively, wherein each of the baseline images contains the background excluding the one or more foreground objects.

3. The method of claim 2, wherein the pixel intensity data associated with each of the plurality of background pixels of the normality background image is obtained from the plurality of baseline images at a same locale of the respective pixel, and wherein the constructing of the normality model comprises:
   calculating the corresponding mean value of the pixel intensity data for each of the plurality of background pixels; and
   calculating the corresponding standard deviation of the pixel intensity data for each of the plurality of background pixels.

4. The method of claim 2, wherein the mean values and the standard deviations comprise a Gaussian distribution or a student-t distribution that substantially fits the plurality of baseline images statistically.

5. The method of claim 1, wherein the receiving of the scene image comprises assessing an illuminating condition of the scene image, wherein the projecting of the normality background image is based on the illuminating condition, and wherein the standard deviation threshold is determined based on the illuminating condition.

6. A method, comprising:
receiving a scene image containing a background and one or more foreground objects of interest;
projecting a normality background image from a normality model, wherein the normality background image contains the background without the one or more foreground objects;
converting the scene image to a first illumination-invariant image using an illumination-invariant color space transformation algorithm;
converting the normality background image to a second illumination-invariant image using the illumination-invariant color space transformation algorithm;
generating a first subtracted image by subtracting the normality background image pixel-wise from the scene image;
generating a second subtracted image by subtracting the second illumination-invariant image pixel-wise from the first illumination-invariant image;
highlighting a plurality of pixels in the first subtracted image based on a standard deviation threshold to obtain a residual image as an identification of at least one of the one or more foreground objects;
applying a multiplying matrix operation between the residual image and the second subtracted image to generate an output image;
displaying the output image on a display device; and
generating a text message, a beeping sound or a flashing light in response to the identification.

7. The method of claim 6, wherein the normality background image comprises a plurality of background pixels, and wherein the normality model comprises corresponding mean values and standard deviations of pixel intensity data associated with each of the background pixels of the normality background image.

8. The method of claim 7, further comprising:
constructing the normality model based on a plurality of baseline images taken under a plurality of illuminating conditions respectively, wherein each of the baseline images contains the background excluding the one or more foreground objects.

9. The method of claim 8, wherein the pixel intensity data associated with each of the plurality of background pixels of the normality background image is obtained from the plurality of baseline images at a same locale of the respective pixel, and wherein the constructing of the normality model comprises:
calculating the corresponding mean value of the pixel intensity data for each of the plurality of background pixels; and
calculating the corresponding standard deviation of the pixel intensity data for each of the plurality of background pixels.

10. The method of claim 6, wherein the highlighting of the pixels in the first subtracted image based on the standard deviation threshold comprises highlighting the pixels in the first subtracted image having corresponding pixel intensity data more than the standard deviation threshold.

11. The method of claim 6, wherein the receiving of the scene image comprises assessing an illuminating condition of the scene image, wherein the projecting of the normality background image is based on the illuminating condition, and wherein the standard deviation threshold is determined based on the illuminating condition.

12. The method of claim 6, wherein the multiplying matrix operation takes the residual image and the second subtracted image of a same dimension as input to produce the output image with the same dimension, and wherein the multiplying matrix operation multiplies pixel intensity data of a same pixel location in the residual image and the second subtracted image respectively.

13. An apparatus implementable to an autonomous vehicle, comprising:
a camera configured to monitor a scene of interest containing a background; and
a processor communicatively coupled to the camera, the processor configured to perform acts comprising:
controlling the camera to take a plurality of baseline images of the scene under a plurality of illuminating conditions, wherein the baseline images are absent from one or more foreground objects;
controlling the camera to record a plurality of scene images;
creating a normality background image based on the baseline images;
generating a first subtracted image by subtracting the normality background image pixel-wise from one scene image of the plurality of scene images to determine whether the one or more foreground objects exist in the one scene image;
generating, via an autonomous driving system of the autonomous vehicle, a signal as a reminder to a passenger of the autonomous vehicle in response to an existence of the one or more foreground objects in the one scene image;
marking the one or more foreground objects in the first subtracted image as a residual image in response to the existence of the one or more foreground objects in the one scene image;
converting the one scene image to a first illumination-invariant image using an illumination-invariant color space transformation algorithm;
converting the normality background image to a second illumination-invariant image using the illumination-invariant color space transformation algorithm;
generating a second subtracted image by subtracting the second illumination-invariant image pixel-wise from the first illumination-invariant image;
applying a multiplying matrix operation between the residual image and the second subtracted image to generate an output image; and
displaying the output image on a display device of the autonomous vehicle to the passenger.

14. The apparatus of claim 13, wherein the normality background image comprises a plurality of background pixels, and wherein, in creating of the normality background image, the processor is configured to construct a normality model from the plurality of the baseline images taken under the plurality of illuminating conditions, the normality model comprising corresponding mean values and standard deviations of pixel intensity data associated with each of the background pixels of the normality background image.

15. The apparatus of claim 14, wherein the pixel intensity data associated with each of the plurality of background pixels of the normality background image is obtained from the plurality of baseline images at a same locale of the respective pixel, and wherein, in constructing the normality model, the processor is configured to perform acts comprising:
- calculating the corresponding mean value of the pixel intensity data for each of the plurality of background pixels; and
- calculating the corresponding standard deviation of the pixel intensity data for each of the plurality of background pixels.

16. The apparatus of claim 14, wherein the mean values and the standard deviations comprise a Gaussian distribution or a student-t distribution that substantially fits the plurality of baseline images statistically.

17. The apparatus of claim 13, wherein the processor is further configured to perform a marking of a plurality of pixels in the first subtracted image based on a standard deviation threshold, and wherein the marking of the pixels in the first subtracted image comprises highlighting the pixels having corresponding pixel intensity data more than the standard deviation threshold.

18. The apparatus of claim 13, wherein the multiplying matrix operation takes the residual image and the second subtracted image of a same dimension as input to produce the output image with the same dimension, and wherein the multiplying matrix operation multiplies pixel intensity data of a same pixel location in the residual image and the second subtracted image respectively.

19. The apparatus of claim 13, wherein the signal comprises a text message, a beeping sound, a flashing light, or a combination thereof.

* * * * *